(12) United States Patent
Ogura et al.

(10) Patent No.: US 7,389,011 B2
(45) Date of Patent: Jun. 17, 2008

(54) OPTICAL FIBER TEMPERATURE SENSOR

(75) Inventors: Masaki Ogura, Hitachi (JP); Masahiko Kobayashi, Hitachi (JP); Hidetaka Kawauchi, Hitachi (JP); Juhyun Yu, Hitachi (JP)

(73) Assignee: Hitachi Cable Ltd., Tokyo (JP)

( * ) Notice: Subject to any disclaimer, the term of this patent is extended or adjusted under 35 U.S.C. 154(b) by 0 days.

(21) Appl. No.: 11/699,389

(22) Filed: Jan. 30, 2007

(65) Prior Publication Data
US 2007/0258087 A1  Nov. 8, 2007

(30) Foreign Application Priority Data
May 2, 2006  (JP) .............................. 2006-128651

(51) Int. Cl.
*G02B 6/00* (2006.01)
(52) U.S. Cl. ........................... 385/12; 385/33; 374/161
(58) Field of Classification Search ................. 385/12, 385/33; 374/161; 250/227.18
See application file for complete search history.

(56) References Cited
U.S. PATENT DOCUMENTS
5,765,948 A * 6/1998 Sai .............................. 374/161

FOREIGN PATENT DOCUMENTS
JP  2-577199 B2  11/1996

* cited by examiner

Primary Examiner—Michael P Mooney
(74) Attorney, Agent, or Firm—Crowell & Moring LLP

(57) ABSTRACT

An optical fiber temperature sensor has a sensing part composed of an optical fiber arranged at a temperature measurement point; a light source for injecting a light to the sensing part; a wavelength filter module for branching the Raman scattered light from the back scattered light generated at the sensing part; photoelectric detectors for detecting the Raman scattered light and a signal processing circuit for processing the electric signals from the photoelectric detectors, wherein the light source is a semiconductor laser having a wavelength bandwidth of 0.78 μm; the wavelength filter module has a longer wavelength side band pass filter for transmitting the Stokes light and a shorter wavelength side band pass filter for transmitting the anti-Stokes light; and the longer wavelength side band pass filter and the shorter wavelength side band pass filter do not allow the light having the wavelength band of the semiconductor laser to be transmitted.

6 Claims, 5 Drawing Sheets

OPTICAL FIBER TEMPERATURE SENSOR

BACKGROUND OF THE INVENTION

The present invention relates to an optical fiber temperature sensor for measuring the temperature by detecting the Raman scattered light generated inside the optical fiber.

Fiber-optic technologies provide such optical sensors as used for measuring temperature, deflection, pressure and the others, in recent years, and specifically, optical fiber temperature sensors are used for sensing the temperature by using Raman scattered light generated at the optical fiber.

FIG. 4 is a schematic diagram of the circuit for the conventional optical fiber temperature sensor.

As shown in FIG. 4, the optical fiber temperature sensor 70 has the sensing part arranged at the temperature measurement point and composed of the optical fiber 71 (long-distance optical fiber for measurement) and the sensor body 72.

The sensor body 72 has the light source 73 for applying the incoming optical signal into the optical fiber 71 (for example, semiconductor laser diode (LD)), and a couple of photoelectric detectors 74 and 75 (for example, avalanche photodiode). The light source 73 and the photoelectric detectors 74 and 75 are connected to the optical fiber 71 used for sensing thorough the wavelength filter module 76. The wavelength filter module 76 has a couple of edge filters, each having its own wavelength range different from each other and branches the Raman scattered light from the back scattered light generated at the optical fiber 71.

The light source 73, being connected to LD driver 77, forms the LD module 78. A couple of photoelectric detectors 74 and 75 are connected to the received signal amplifiers 79 and 79, respectively. The received signal amplifiers 79 and 79 are connected to A/D (Analog-to-Digital) converters 80 and 80, respectively. A/D converter 80 and the LD module 78 are connected to the signal processing control circuit 81. The signal processing control circuit 81 has the signal control circuit 82 (for example, MCU (Micro Control Unit)) and the signal processing circuit 83 (for example, FPGA (Field Programmable Gate Array)), and the signal processing circuit 83 is connected to the external arithmetic processing means 84 (for example, personal computer).

The optical fiber 71 forming the sensing part is typically a multi-mode fiber or a single-mode fiber, which is generally used for communication and has a core doped with Ge and the other materials.

When injecting the pulsed optical signal generated at the LD module 78 into the optical fiber 71, the weak Raman scattered light is generated at individual places in the optical fiber 71. As shown in FIG. 5, the frequency spectrum of the Raman scattered light maps the frequencies located symmetrically below and above the center wavelength $\lambda_0$ of the incoming light. The back-scattered light having the spectrum at the center wavelength $\lambda_0$ of the incoming light is the Rayleigh scattered light R. The Raman scattered light with the spectrum above the center wave length is designated Stokes light St, and the Raman scattered light with the spectrum below the center wave length is designated anti-Stokes light As.

The intensity ratio between the Stokes light St and the anti-Stokes light As, both generated at the optical fiber 71, depends on the temperature of the optical fiber 71. Therefore, the temperature of the temperature-measured object affects the temperature of the optical fiber 71, and thus, contributes to the detected intensity ratio between the Stokes light St and the anti-Stokes light As. The temperature of the temperature-measured object can be measured by obtaining this intensity ratio.

In the optical fiber temperature sensor 70, the backscattered Stokes light St and the backscattered anti-Stokes light As are separated by the wavelength filter module 76, and received separately by the photoelectric detectors 74 and 75, respectively. The received light is converted into the electric signal, and then the electric signal is amplified by the received signal amplifier 79, and the amplified electric signal is converted into the digital signal by A/D converter 80, and the digital signal is supplied to the signal processing control circuit 81. The electric signal is processed by the signal processing control circuit 81 and the external arithmetic processing means 84 in order to calculate the temperature, and finally the measured temperature is displayed.

SUMMARY OF THE INVENTION

In the conventional optical fiber temperature sensor 70, LD having a high power and a wavelength between 850 nm and 1550 nm is used for the light source 73 so as to be controlled to keep the temperature constant. This type of LD is a specific device and very expensive.

In order to drive LD in pulsed operation with large current, as the scale of the circuit becomes large inevitably as well as the heat generation from LD becomes large in pulse operation, it is required to control the temperature to be constant in order to stabilize the wavelength of the emitted light from LD, which leads to an increased complexity of the overall circuit. Thus, it results in the cost increase in the overall optical fiber temperature sensor in order to realize the above described circuit configuration.

An object of the present invention is to provide a low-cost optical fiber temperature sensor without such large-scale LD driving circuit and temperature control circuit required.

As for the means for solving the above problem, such semiconductor laser (LD for CD, which stands for Compact Disc) having the wavelength of 0.78 μm which is conventionally used for the pickup device in CD but not used for the temperature sensor. As LD for CD is very low cost and it's dedicated LD driver ICs are available in circulation, it is easy to realize the pulse driving circuit, and thus, the cost of the optical fiber temperature sensor can be reduced.

There are the following problems in applying LDs for CD.

(1) As LD for CD does not include the temperature control element, the temperature control is not provided consequently in applying LD for CD. As the temperature of LD for CD changes due to the changes in the outside air temperature, the deviation in the wavelength is larger than LD used in the conventional optical fiber temperature sensor with its temperature being controlled to be constant. (2) The wavelength range of the emitted light from LD for CD is 0.78 μm and shorter than the wavelength of LD used in the conventional optical fiber temperature sensor. Therefore, the wavelength of As light and St light becomes closer to the wavelength of Rayleigh scattered light (the incoming light into the optical fiber) than the optical fiber temperature sensor using LD having a longer wavelength.

As the wavelength of the light source is stable in the conventional wavelength filter, and the wavelength of the light source and the wavelength of AS light and St light are well separated apart from each other, the slope (the characteristic curve) between the wavelength of the pass band and the wavelength of the cut band is relatively gentle.

In case of applying the conventional optical filter, there may occur such a problem that the component of Rayleigh scattered light interferes inside the pass band for As light or St light and hence, the precise temperature measurement can not be established depending on the temperature in which LD for CD is used and operated, rather than the above problems (1) and (2).

As for the relation of the transmission characteristic of the wavelength filter, the wavelength of the light source and the Raman scattered light, referring to FIG. 6 (a), in case that the wavelength of the light source is longer and the temperature is controlled to be constant in the conventional optical fiber temperature sensor, as the wavelength of the light source and the wavelength of As light and St light are well separated apart from each other and the wavelength of the light source is stabilized, the cut-off characteristic of the wavelength filter may be allowed to be gentle. Note that the broken line in FIG. 6(a) shows the wavelength characteristic of the scattered light at the temperature of 25, and the solid line shows the wavelength characteristic of the scattered light in case that the center wavelength of the light source is shifted toward the shorter wavelength due to the individual difference in the light sources or the decrease in the temperature.

Next, referring to FIG. 6(b), in case that the wavelength of the light source is shorter and the temperature is not controlled, as the wavelength of the light source comes close to the wavelength of As light and St light, and the deviation of the wavelength due to the temperature change is larger, the wavelength component of the light source may interfere with the wavelength range of As light or St light subject to a little deviation in the wavelength.

Another object of the present invention is to provide an optical fiber temperature sensor enabling the precise temperature measurement even with a low-cost and short-wavelength LD in order to solve the above problem.

In order to attain the above object, the invention of claim 1 is characterized as an optical fiber temperature sensor comprising
- a sensing part composed of an optical fiber arranged at a temperature measurement point;
- a light source for injecting a light to the sensing part;
- a wavelength filter module for branching a Raman scattered light from a back scattered light generated at the sensing part;
- a photoelectric detector for detecting the Raman scattered light; and
- a signal processing circuit for processing an electric signal from the photoelectric detector, wherein
  - the light source is a semiconductor laser having a wavelength bandwidth of 0.78 μm.

The invention of claim 2 is characterized as an optical fiber temperature sensor comprising
- a sensing part composed of an optical fiber arranged at a temperature measurement point;
- a light source for injecting a light to the sensing part;
- a wavelength filter module for branching a Raman scattered light from a back scattered light generated at the sensing part;
- a photoelectric detector for detecting the Raman scattered light; and
- a signal processing circuit for processing an electric signal from the photoelectric detector, wherein
  - the light source is a semiconductor laser having a wavelength bandwidth of 0.78 μm;
  - the wavelength filter module is composed of a longer wavelength side band pass filter for transmitting a Stokes light and a shorter wavelength side band pass filter for transmitting an anti-Stokes light; and
  - the longer wavelength side band pass filter and the shorter wavelength side band pass filter do not allow the light having the wavelength band of the semiconductor laser to be transmitted.

The invention of claim 3 is characterized as an optical fiber temperature sensor of claim 2, wherein the semiconductor laser is not controlled to be a constant temperature.

The invention of claim 4 is characterized as an optical fiber temperature sensor of claim 2 or 3, wherein
- a center wavelength of the pass band of the longer wavelength side band pass filter is shifted from the wavelength of the Stokes light toward the longer wavelength side; and
- a center wavelength of the pass band of the shorter wavelength side band pass filter is shifted from the wavelength of the anti-Stokes light toward the shorter wavelength side.

The invention of claim 5 is characterized as an optical fiber temperature sensor of claim 4, wherein
- at a case temperature of the semiconductor laser between 10° C. and 50° C., supposing that $\lambda_C$ is a center wavelength of the semiconductor laser,
- the longer wavelength side band path filter is set up so that a minimum transmission wavelength of the pass band may be $((\lambda_C-785)+802$ nm$)$ or longer, and its maximum transmission wavelength may be $((\lambda_C-785)+821$ nm$)$ or longer, and that a cut-off characteristic for a wavelength of the light source is 4.5 dB/nm or higher; and
- the shorter wavelength side band path filter is set up so that a minimum transmission wavelength of the pass band may be $((\lambda_C-785)+751$ nm$)$ or shorter, and its maximum transmission wavelength may be $((\lambda_C-785)+768$ nm$)$ or shorter, and that a cut-off characteristic for a wavelength of the light source is 4.5 dB/nm or higher.

The invention of claim 6 is characterized as an optical fiber temperature sensor of any one of claims 1 to 5, wherein at an LD case temperature between 10° C. and 50° C., a center wavelength of the semiconductor laser, $\lambda_C$, is between 776 nm and 794 nm.

The invention of claim 7 is characterized as an optical fiber temperature sensor of any one of claims 1 to 6, wherein a heater for temperature control is provided at the light source.

The invention of claim 8 is characterized as an optical fiber temperature sensor of any one of claims 1 to 7, wherein an aspheric lens is provided between the light source and the optical fiber.

As shown in FIG. 6C, the optical fiber temperature sensor according to the present invention can cut off the Rayleigh scattered light component by providing a steep slope in the cut-off characteristic of the wavelength filter even if the wavelength of the light source is short and the light source of the temperature is not controlled.

According to the present invention, it will be appreciated that the temperature can be measured precisely even if using a low-cost short wavelength LD.

DETAILED DESCRIPTION OF THE PREFERRED EMBODIMENTS

Now, referring to attached figures, the preferred embodiment of the present invention will be described in detail.

Figure 1:
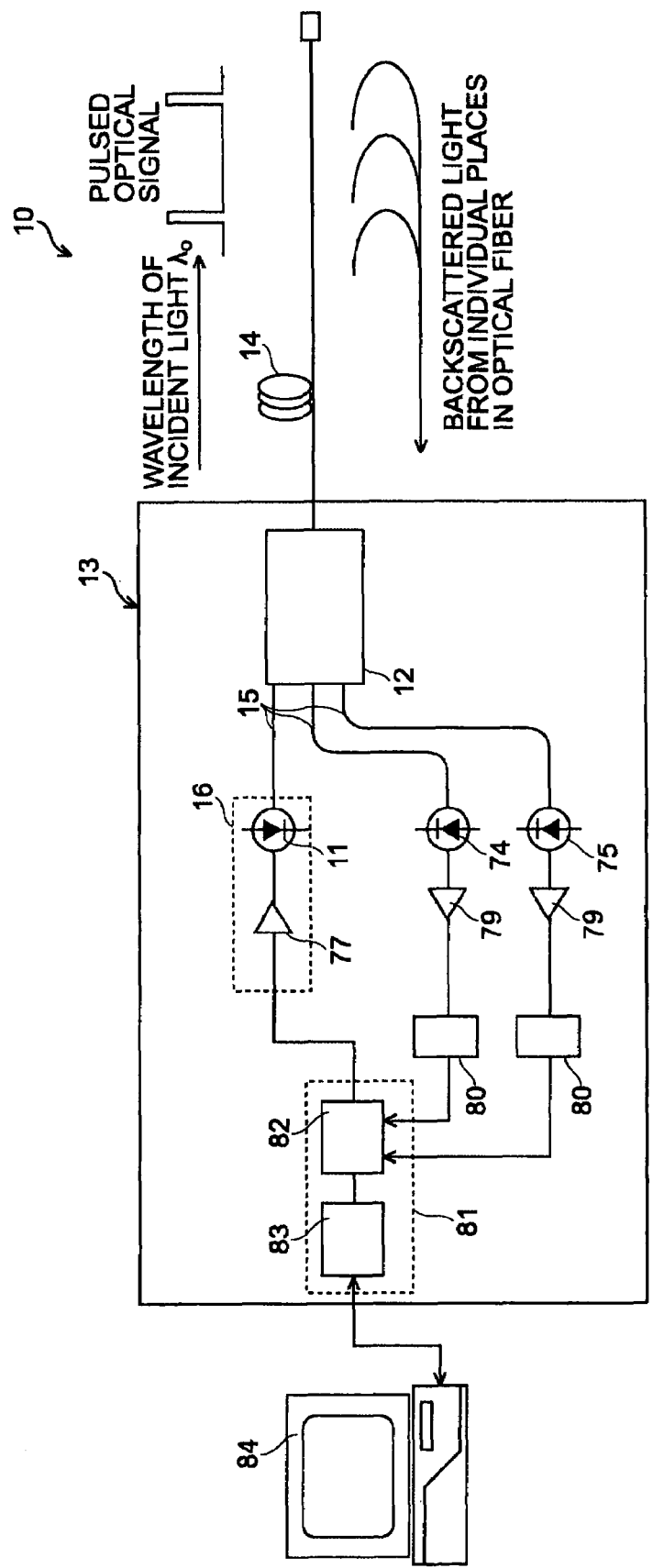
FIG. 1 is a schematic circuit diagram showing one preferred embodiment of the optical fiber temperature sensor according to the present invention.

FIG. 1 is a schematic circuit diagram showing one preferred embodiment of the optical fiber temperature sensor according to the present invention.

As shown in FIG. 1, the optical fiber temperature sensor 10 includes a sensing part comprising the optical fiber 14 arranged at individual places for measuring the temperature, a light source 11 for injecting the light into the sensing part, a wavelength filter module 12 for separating the Raman scattered light from the backscattered light generated at the sensing part, photoelectric detectors 74 and 75 for detecting the Raman scattered light, and a signal processing control circuit 81 for processing the electric signal from the photoelectric detectors 74 and 75.

Figure 4:
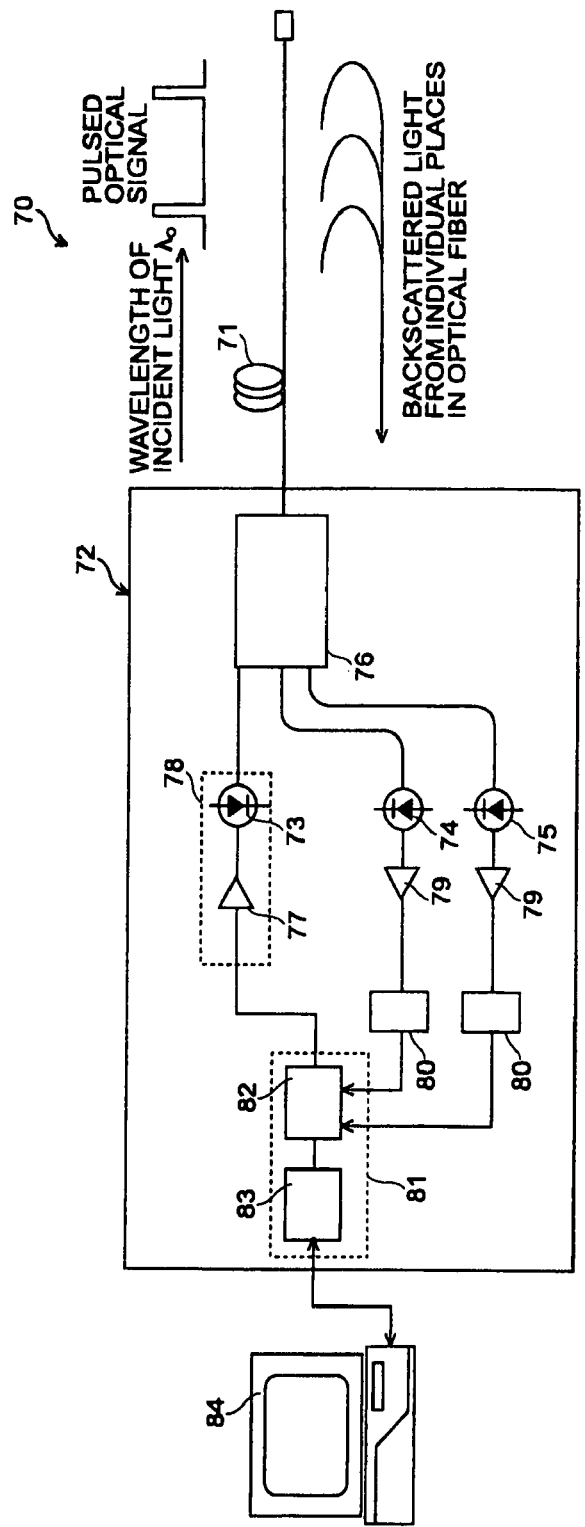
FIG. 4 is a schematic circuit diagram showing the conventional optical fiber temperature sensor.
Figure 5:
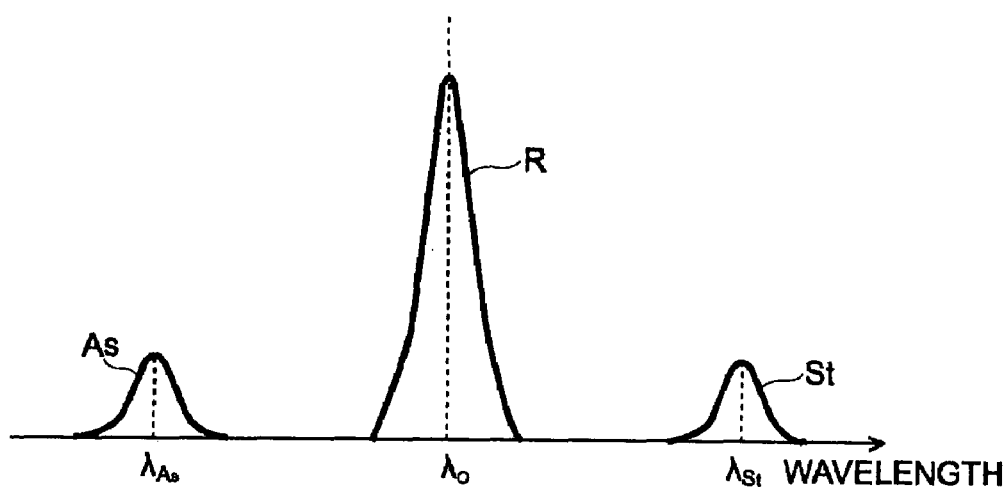
FIG. 5 is a schematic diagram showing the spectrums of the Rayleigh scattered light and the Raman scattered light.
Figure 6A:
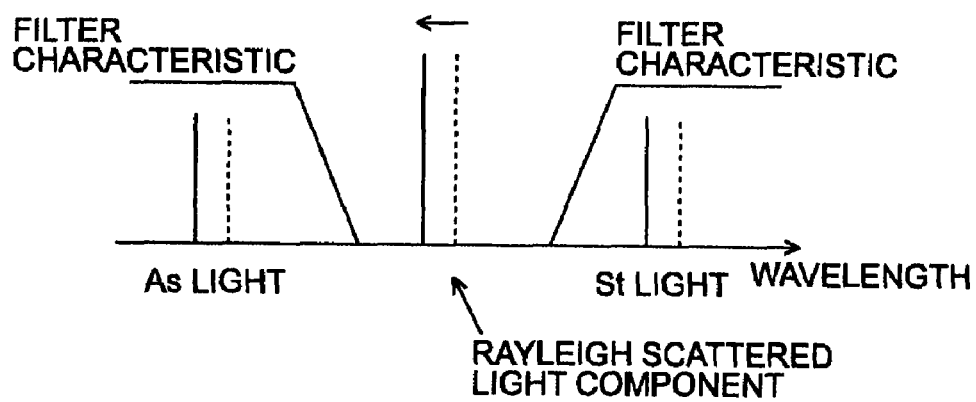
FIG. 6A is a schematic diagram showing the filter characteristic of the wavelength filter module to be used in the conventional optical fiber temperature sensor.
Figure 6B:
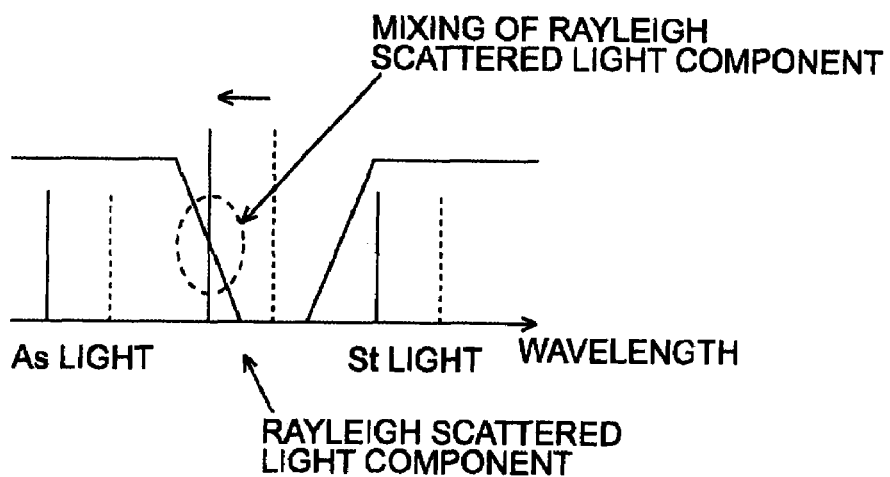
FIG. 6B is a schematic diagram showing the filter characteristic with the Rayleigh scattered light component being mixed.
Figure 6C:
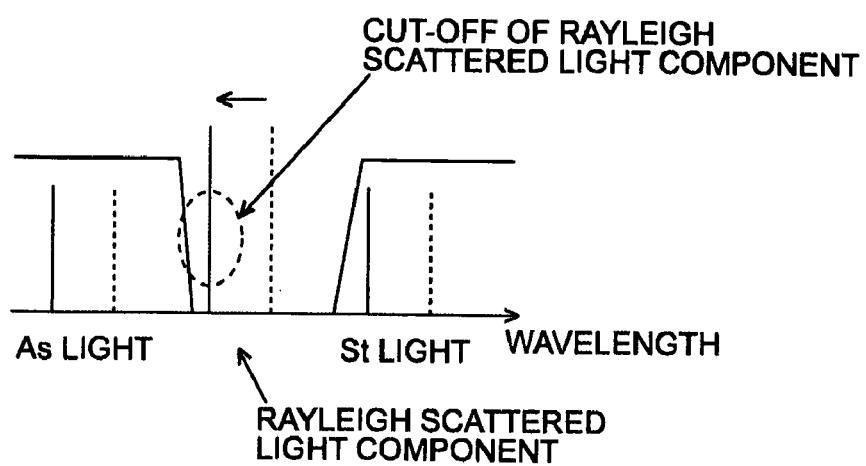
FIG. 6C is a schematic diagram showing the filter characteristic with the Rayleigh scattered light component being cut-off.

The optical fiber temperature sensor 10 is characterized by the light source 11 and the wavelength filter module 12, in which other component are the same as the component in the configuration of the optical fiber temperature sensor 70 shown in FIG. 4. The wavelength filter module 12 is connected optically to the optical fiber 14 at the sensing part, the light source 11, the photoelectric detector 74 for detecting the As light and the photoelectric detector 75 for detecting the St light through the optical fiber 15 for optical connection.

The optical fiber temperature sensor 10 in this embodiment uses a semiconductor laser having the wavelength of 0.78 μm as the light source 11 (LD module 16). As for the semiconductor laser having the wavelength of 0.78 μm, a typical semiconductor laser (LD for CD) generally used for a pickup element in CD (Compact Disc) is used. As LD for CD is available commercially in low cost, the overall cost of the optical fiber temperature sensor 10 can be reduced by using LD for CD.

It will be appreciated that, applying LD having the wavelength of 0.78 μm, the intensity of the detected Raman scattered light can be made larger enough if the length of the sensing part is short in comparison with the case of applying such LD having a long wavelength as in the conventional optical fiber temperature sensor.

As the optical fiber temperature sensor 10 of this embodiment uses the light source with the wavelength of 0.78 μm shorter than the wavelength of the light source of the conventional optical fiber temperature sensor, and also uses the semiconductor laser without controlling the temperature to be constant, the optical fiber temperature sensor 10 is characterized by the long wavelength band pass filter for transmitting Stokes light (St light) and the short wavelength band pass filter for transmitting anti-Stokes light (As light) in which they have a steep slope in the cut-off characteristic curve and the range of the pass band is so adjusted that St light and As light may be transmitted effectively even if their wavelength deviation occurs due to the wavelength deviation in the light source. Note that "a steep slope in the cut-off characteristic curve" means that the slope of the characteristic curve for light transmission coefficient is steep at the boundary between the pass band wavelength and the cut band wavelength in the band pass filter.

Figure 2:
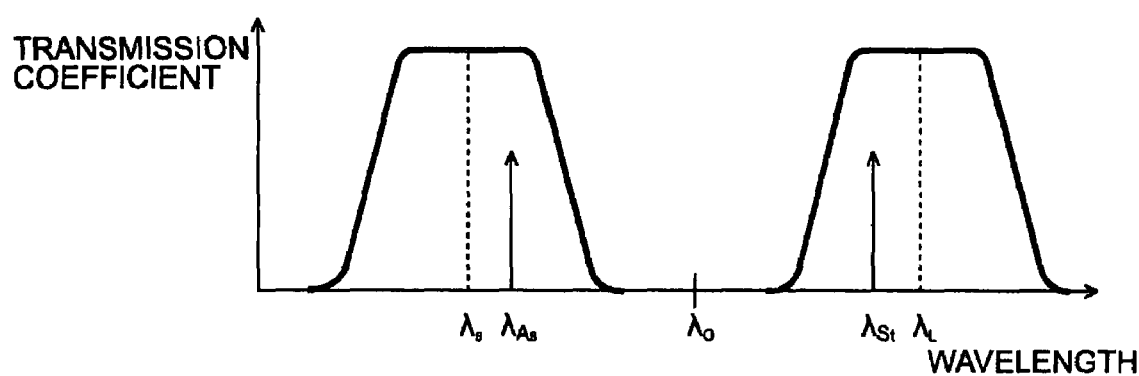
FIG. 2 is an overall filter characteristic of the wavelength filter module.

FIG. 2 shows the filter characteristic of the wavelength filter module. In FIG. 2, $\lambda_0$ is the center wavelength of the emitted light of the light source, $\lambda_{St}$ is the center wavelength of the Stokes light, and $\lambda_{As}$ is the center wavelength of the anti-Stokes light.

The optical fiber temperature sensor 10 in this embodiment uses LD having the wavelength of 0.78 μm without controlling the temperature to be constant. As the wavelength of the emitted light from the light source is determined so as to have the wavelength range around 0.78 μm, which is shorter than the wavelength in the conventional LD, the difference between the wavelength of the Raman scattered light (As light and St light) and the wavelength of the light source is smaller than that in the conventional LD. In addition, as the temperature of the light source is not controlled to be constant, the deviation in the wavelength of the emitted light from the light source becomes large. Thus, it is required to make the pass band for allowing As light and St light to be transmitted wide enough to accommodate the deviation in the wavelength.

As the difference between the wavelength of the emitted light from the light source and the wavelength of the Raman scattered light is also small, the wavelength of the light source inevitably falls into the pass band in case of using the band pass filter having "a gentle slope in the cut-off characteristic curve." Therefore, the band pass filter having "a steep slope in the cut-off characteristic curve" is used for isolating the wavelength of the light source from the pass band.

The width of the pass band of the band pass filter cannot be determined freely to be an arbitrary value but should be selected from discrete values. Thus, it is difficult to adjust precisely the width of the pass band to be as small as the deviation in the wavelength of the light source, for example, about 20 nm.

Thus, the width of the pass band of the band pass filter is determined so as to be the selectable value larger than the deviation in the wavelength of the light source, that is, 20 nm. In this case, however, if the center wavelength of the pass band is adjusted so as to be the center value of the deviation in the wavelength of As light or St light, as the width of the pass band is wider than the width of the deviation in the wavelength of the light source, the pass band is covered by the deviation in the wavelength of the light source, and hence, the interfering light having the wavelength of the light source is transmitted.

In order to solve this problem, in the optical fiber temperature sensor 10 in this preferred embodiment, the longer wavelength side band path filter is so configured that the center wavelength $\lambda_l$ of its transmission band may be located above the wavelength $\lambda_{St}$ of the Stokes light, and the shorter wavelength side band path filter is so configured that the center wavelength $\lambda_S$ of its transmission band may be below the wavelength $\lambda_{As}$ of the anti-Stokes light.

Note that the component of the Raman scattered light may be cut off if the center wavelength of the band pass filter is shifted so far from the center wavelength of the Raman scattered light. Therefore, it is required to determine the center wavelength of the band pass filter so that only the Raman scattered light may be transmitted and that the scattered light having the wavelength of the light source may not be mixed.

In the wavelength filter module 12, the longer wavelength side band path filter is so configured that the minimum transmission wavelength of the pass band may be 802 nm or longer, and that the maximum transmission wavelength of the pass band may be 821 nm or longer; and the shorter wavelength side band path filter is so configured that the minimum transmission wavelength of the pass band may be 751 nm or shorter, and that the maximum transmission wavelength of the pass band may be 768 nm.

Figure 3:
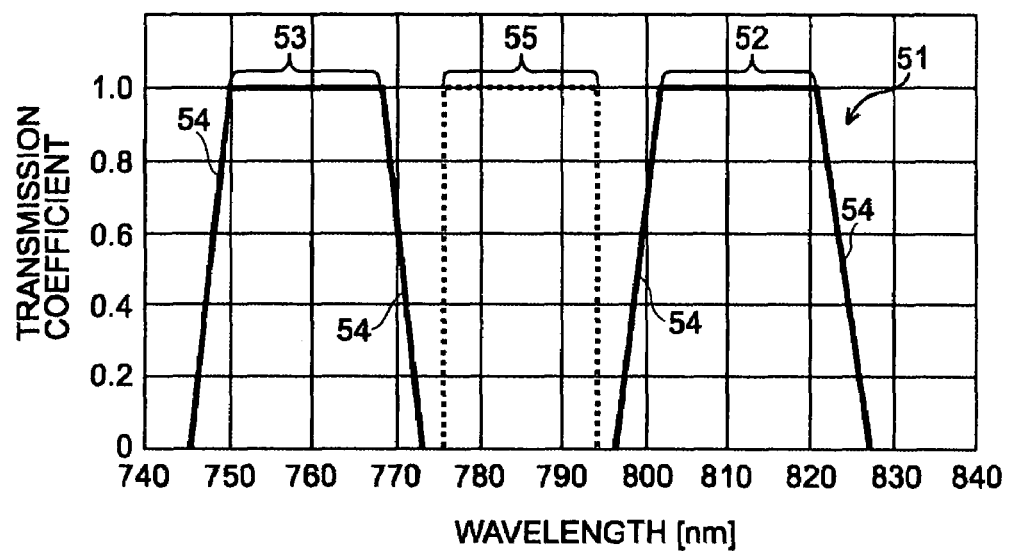
FIG. 3 is a typical filter characteristic of the wavelength filter module.

FIG. 3 shows a typical filter characteristic of the wavelength filter module used in this embodiment.

As shown in FIG. 3, the wavelength filter module of this preferred embodiment has such filter characteristics 51 that the transmission band 52 for the Stokes light (the transmission band of the longer wavelength side band pass filter (BPF)) is between 802 nm and 821 nm, the transmission band 53 for the anti-Stokes light (the transmission band of the shorter wavelength side BPF) is between 751 nm and 768 nm, and the cut off characteristic for the longer wavelength side band pass filter and the shorter wavelength side band pass filter is 4.5 dB/nm.

The filter characteristics 51 are determined by the band width 55 of the wavelength of the light source (shown by broken line in FIG. 3), the band width of the wavelength of the Raman scattered light (the band width 52 of the transmission band for the Stokes light and the band width 53 for the transmission band for the anti-Stokes light.)

Now, the design rationale for the wavelength range of the light source is described. In this preferred embodiment, in case of using a general LD having the wavelength of 0.78 μm as the light source 11, the deviation of the wavelength of the emitted light from LD itself is between 779 nm and 789 nm under the condition in which the temperature Tc of LD module case is 25° C.

The temperature change in LD gives the change in the wavelength of the emitted light, and its wavelength is obtained by the following formula (1).

$$\lambda = (T_c - 25)/5 + \lambda_0 \quad (1)$$

In this formula, Tc is the temperature of LD case, and $\lambda_0$ is the wavelength at $T_c = 25°$ C. In case that the temperature of LD case is 10° C., the wavelength of the emitted light is shifted by 3 nm to the shorter wavelength side in comparison with the case of 25° C.; and in case that the temperature of LD case is 50° C., the wavelength of the emitted light is shifted by 5 nm to the longer wavelength side in comparison with the case of 25° C. Thus, considering both of the deviation of the wavelength of the emitted light from LD itself and the deviation of the wavelength due to the temperature change, the wavelength range of the light source is estimated to be between 776 nm and 794 nm, and the deviation of the center wavelength of LD is estimated to be 18 nm in consideration of the effect of the temperature change.

Next, the design rationale for the wavelength band widths 52 and 53 of the Raman scattered light is described.

The characteristics of the Raman scattered light are determined by the wavelength of the pulsed optical signal (the wavelength of the excited light) to be injected into the optical fiber 14 at the sensing part. The relationship between the wavelength of the excited light and the wavelengths of the excited Stokes light and the excited anti-Stokes light are shown in Table 1.

TABLE 1

| Raman-shift Wave Number [m − 1] | Excited Light Wavelength [nm] | Stokes Light Peak Wavelength [nm] | anti-Stokes Light Peak Wavelength [nm] |
|---|---|---|---|
| 42000 | 776 | 802.1 | 751.5 |
|  | 785 | 811.8 | 759.9 |
|  | 794 | 821.4 | 768.4 |

In Table 1, the Raman shift wave number is the Raman scattered shift wave number in the optical fiber composed of SiO2 with GeO2 doped together. The wavelength of the Raman scattered light is given by the following formula (2), in which k is the Raman shift wave number, and $\lambda_0$ is the wavelength of the light source. In the formula (2), the positive and negative symbols, + and −, at the dominator correspond to As light and St light, respectively.

$$\lambda_r = 1/[1/\lambda_0 \pm K] \quad (2)$$

In the column for the excited wavelength in Table 1, the wavelength of 776 nm represents the minimum wavelength of the emitted light from the light source, the wavelength of 794 nm represents the maximum wavelength of the emitted light from the light source, and the wavelength of 785 nm represents the medium value between the maximum wavelength and the minimum wavelength.

According to Table 1, it will be appreciated that, in case that the wavelength of the light source is 776 nm, as the Stokes light with the wavelength of 802.1 nm and the anti-Stokes light with the wavelength of 751.5 nm are generated, the lower-bound of the wavelength band width for transmitting the Stokes light is determined to be 802 nm and the lower-bound of the wavelength band width for transmitting the anti-Stokes light is determined to be 751 nm.

In the similar manner, it will be appreciated that, in case that the wavelength of the excited light is 794 nm, as the Stokes light with the wavelength of 821.4 nm and the anti-Stokes light with the wavelength of 768.4 nm are generated, the upper-bound of the wavelength band width for transmitting the Stokes light is determined to be 821 nm and the upper-bound of the wavelength band width for transmitting the anti-Stokes light is determined to be 768 nm.

Next, the design rationale for the cutoff characteristics 54 is described.

If the Rayleigh scattered light provided as the backscattered light with about the same wavelength as the wavelength of the emitted light from the light source is detected by the photoelectric detectors 74 and 75, as it causes the measurement error, it is required to cut off the light having the wavelength band width of the pulsed optical signal of the emitted light from the light source. The intensity of the Raman scattered light is about 1/1000 times larger than the intensity of the Rayleigh scattered light, and "to cut off the light having the wavelength band width of the emitted light from the light source" means to reduce the intensity of the Rayleigh scattered light by 30 dB or more by means of the wavelength filter. In addition, the minimum difference between the wavelength of the emitted light from the light source and the wavelength of the Raman scattered light is 8.1 nm according to the wavelength band width 55 of the light source and the transmission wavelength band widths 52 and 53 of the Raman scattered light. Considering that the distributed range of the wavelengths of the emitted light from the light source (the spectral band width) is about 1.5 nm, the difference between the wavelength of the emitted light from the light source and the wavelength of the Raman scattered light is 6.6 nm. Thus, the cut-off characteristic is so designed that the light intensity should be reduced by 30 dB or more for the wavelength difference of 6.6 nm. Consequently, the cut-off characteristic is designed to be 4.5 db/nm or higher.

Typically, the center wavelength at LD case temperature between 10° C. and 50° C. depends on the manufactures of LDs. Therefore; the characteristic of the wavelength filter is estimated on the basis of the above formula (1) by assuming that $\lambda_C$ is the center wavelength when LD case temperature is between 10° C. and 50° C.

The longer wavelength side band path filter is set up so that the minimum transmission wavelength of the pass band may be (($\lambda_C$−785)+802 nm) or longer, and its maximum transmission wavelength may be (($\lambda_C$−785)+821 nm) or longer, and that the cut-off characteristic for the wavelength of the light source is 4.5 dB/nm or higher. The shorter wavelength side band path filter is set up so that the minimum transmission wavelength of the pass band may be (($\lambda_C$−785)+751 nm) or shorter, and its maximum transmission wavelength may be (($\lambda_C$−785)+768 nm) or shorter, and that the cut-off characteristic for the wavelength of the light source is 4.5 dB/nm or higher.

In case that the deviation in the wavelength is 18 nm or larger under the operation temperature range, the wavelength filter so designed as to have the above described characteristic is used, and a heater for controlling the temperature of LD not to be less than a designated temperature value is attached to LD in order to reduce the deviation in the wavelength due to the temperature change. Owing to using LD having such a heater, it will be appreciated to attain low power consumption and low cost without using Peltier elements.

By using the wavelength filter module 12 having such filter characteristics as shown in FIG. 3, it will be appreciated that the optical fiber temperature sensor 10 can measure the temperature precisely by way of satisfactory isolation between the Raman scattered light and the emitted light from the light source.

Note that a shift (deviation) in the wavelength of the emitted light from the light source due to the temperature change in the sensor body 13 gives the deviation in the wavelength of the Raman scattered light. As the wavelength filter module 12 of the optical fiber sensor 10 in this preferred embodiment is so formed as to consider the shift in the wavelengths of the emitted light from the light source and the Raman scattered light, it is not required to control the temperature of the light source 11.

Thus, as it is not required to control the temperature of the light source 11, it is not required to provide a cooling means such as Peltier elements, which leads to low power consumption, device downsizing and structural simplification.

In this preferred embodiment, though the temperature control apparatus for the light source 11 is not provided, it is allowed that a heater (not shown) may be attached to LD module 16 for reducing the deviation in the wavelength of the emitted light from the light source in order to control the temperature of the light source 11 so as not to become lower than a designated temperature (for example, 10° C.)

It is also allowed that an aspheric lens is provided between the light source 11 and the connecting optical fiber 15 for connecting between the light source and the wavelength filter module. By using the aspheric lens, it will be appreciated that the incident angle of the emitted light from the light source to the optical fiber 15 can be reduced, and thus, the coupling loss from the light source 11 to the injection to the optical fiber 14 can be reduced.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims. The embodiment of the present invention is not limited to the above-described preferred embodiment.

What is claimed is:

1. An optical fiber temperature sensor comprising:
   a sensing part composed of an optical fiber arranged at a temperature measurement point;
   a light source injecting a light to the sensing part;
   a wavelength filter module for branching a Raman scattered light from a back scattered light generated at said sensing part;
   a photoelectric detector for detecting said Raman scattered light; and
   a signal processing circuit for processing an electric signal from the photoelectric detector, wherein
   said light source is a semiconductor laser having a wavelength of 0.78 μm;
   said wavelength filter module is composed of a longer wavelength side band pass filter for transmitting a Stokes light and a shorter wavelength side band pass filter for transmitting an anti-Stokes light; and
   the longer wavelength side band pass filter and the shorter wavelength side band pass filter do not allow the light having the wavelength band of said semiconductor laser to be transmitted,
   a center wavelength of the pass band of said longer wavelength side band pass filter is shifted from the wavelength of the Stokes light toward the longer wavelength side; and
   a center wavelength of the pass band of said shorter wavelength side band pass filter is shifted from the wavelength of the anti-Stokes light toward the shorter wavelength side.

2. The optical fiber temperature sensor according to claim 1, wherein said semiconductor laser is not controlled to be a constant temperature.

3. The optical fiber temperature sensor according to claim 1, wherein at an LD case temperature between 10° C. and 50° C., a center wavelength of said semiconductor laser, $\lambda_C$, is between 776 nm and 794 nm.

4. The optical fiber temperature sensor according to claim 1, wherein a heater for temperature control is provided at said light source.

5. The optical fiber temperature sensor according to claim 1, wherein an aspheric lens is provided between said light source and said optical fiber.

6. An optical fiber temperature sensor comprising:
   a sensing part composed of an optical fiber arranged at a temperature measurement point;

a wavelength filter module for branching a Raman scattered light from a back scattered light generated at said sensing part;

a photoelectric detector for detecting said Raman scattered light; and a signal processing circuit for processing an electric signal from the photoelectric detector, wherein the light source is a semiconductor laser having a wavelength of 0.78 μm;

said wavelength filter module is composed of a longer wavelength side band pass filter for transmitting a Stokes light and a shorter wavelength side band pass filter for transmitting an anti-Stokes light; and the longer wavelength side band pass filter and the shorter wavelength side band pass filter do not allow the light having the wavelength band of said semiconductor laser to be transmitted, a center wavelength of the pass band of said longer wavelength side band pass filter is shifted from the wavelength of the Stokes light toward the longer wavelength side;

a center wavelength of the pass band of said shorter wavelength side band pass filter is shifted from the wavelength of the anti-Stokes light toward the shorter wavelength side; and, at a case temperature of said semiconductor laser between 10° C. and 50° C., supposing that $\lambda_C$, is a center wavelength of said semiconductor laser, the longer wavelength side band pass filter is set up so that a minimum transmission wavelength of the pass band may be at least $((\lambda_C-785)+802$ nm) and its maximum transmission wavelength may be at least $((\lambda_C-785)+821$ nm), and that a cut-off characteristic for a wavelength of the light source is at least 4.5 db/nm; and the shorter wavelength side band pass filter is set up so that a minimum transmission wavelength of the pass band may be at least $((\lambda_C-785)+751$ nm), and its maximum transmission wavelength may be at least $((\lambda_C-785)+768$ nm), and that a cut-off characteristic for a wavelength of the light source is at least 4.5 dB/nm.

* * * * *